United States Patent
Berlin

(10) Patent No.: US 7,533,233 B2
(45) Date of Patent: May 12, 2009

(54) ACCOMMODATING MULTIPLE OPERATING SYSTEMS AND MEMORY SIZES ON IA-32 PLATFORMS

(75) Inventor: Kimon Berlin, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1537 days.

(21) Appl. No.: 10/698,586

(22) Filed: Oct. 31, 2003

(65) Prior Publication Data
US 2005/0108494 A1  May 19, 2005

(51) Int. Cl.
*G06F 12/02* (2006.01)
(52) U.S. Cl. ............... 711/170; 710/10; 711/173
(58) Field of Classification Search ............... None
See application file for complete search history.

(56) References Cited
U.S. PATENT DOCUMENTS
6,694,418 B2 * 2/2004 Schelling et al. ............ 711/171
7,404,063 B2 * 7/2008 Berlin ........................ 711/202

\* cited by examiner

*Primary Examiner*—Gary J Portka
(74) *Attorney, Agent, or Firm*—Kevin M. Hart

(57) ABSTRACT

A method of configuring IA-32 computer resources accommodates multiple operating systems and memory sizes automatically. If total available physical memory does not exceed 4 GB, then the minimum required memory-mapped IO size is rounded up to the next multiple of 128 M. Otherwise, it is rounded up to the next multiple of x, where x is a function of the number of DIMM socket pairs available. TOLM is set to 4 GB minus the rounded memory-mapped IO size. For operating systems that can address only up to 4 GB, the method chooses an acceptable value for TOLM because the granularity used to choose it is reasonably small—128 MB. For operating systems that can address more than 4 GB, the method chooses an exceptionally good value for TOLM: Regardless of the amount of memory available, the BIOS can define caching characteristics for all of the memory using at most 6 MTRR pairs.

16 Claims, 2 Drawing Sheets

ACCOMMODATING MULTIPLE OPERATING SYSTEMS AND MEMORY SIZES ON IA-32 PLATFORMS

FIELD OF THE INVENTION

This invention relates generally to computer system programming, and more particularly to techniques for configuring computer system resources on IA-32 platforms.

BACKGROUND

Address Space, Cacheability. MTRR's, and the BIOS. Beginning with the introduction of the Pentium Pro, microprocessors in the IA-32 family provide a 36-bit address bus. This enables them to support up to 64 GB of physical memory. All or portions of this physical memory may be cached in various ways in order to enhance performance. For example, one region of the address space may be designated as write-through, another may be designated as write-back, while still others may be designated as write-protected, write-combining or uncacheable. Assigning such cacheability characteristics to regions of the address space may be achieved by writing appropriate values into one or more pairs of memory type range registers ("MTRR's"). In most IA-32 computer systems, firmware known as the basic input-output system ("BIOS") begins executing prior to loading the operating system and configures certain resources within the computer including the MTRR's. Thus, it is generally a BIOS function to define caching behavior for regions within physical memory by programming the MTRR's.

Memory-Mapped IO. IA-32 processors permit applications to access input/output ("IO") ports in either of two ways: through a separate IO address space or through the physical memory address space. The latter approach is commonly referred to as "memory-mapped IO." Accessing IO ports through the separate IO address space is achieved using a special set of IO instructions. Accessing IO ports through the physical memory address space, on the other hand, has the advantage that any of the processor's instructions that reference memory may be used to interact with IO devices.

Memory-mapped IO does present complications, however. One such complication arises in the context of cacheability: When controlling IO devices, it is usually important that IO operations be executed in precisely the order in which they are programmed to occur. Consequently, it is generally recommended that the portion of the physical address space to be used for memory-mapped IO should be designated as uncacheable. This is so because designating a memory-mapped IO region of the physical address space as uncacheable insures that reads from and writes to locations in the uncacheable region are carried out in program order.

Chipsets, the 4 GB Boundary and the Top of Lower Memory. Accesses to main memory by the CPU and other devices within a computer are generally handled by a memory controller chip—one of several chips commonly known as the "chipset." A chipset provides bus interface, data path, instruction caching and similar functions on the motherboard. The BIOS must configure the chipset at boot time with information about where main memory is located. If memory-mapped IO is in use, then the chipset must have information not only about where the actual main memory will be located, but also about where the memory-mapped IO region will be located within the physical memory address space.

Intel E7501 and similar chipsets for IA-32 platforms are designed to assume that certain devices will always be mapped into the peripheral component interconnect ("PCI") memory address range—that is, the address range beginning at 4 GB and extending downward far enough to include a certain size of addresses. Specifically, they assume that the advanced programmable interrupt controller ("APIC") addresses, the hub interface addresses, and any memory-mapped IO addresses will reside in this range. For purposes of this document, therefore, references made to "PCI memory," the "PCI memory address range," or the "PCI range" shall mean the range of addresses beginning at 4 GB (actually 4096 MB) and extending downward far enough to include the size of the APIC addresses, the hub interfaces addresses, and the memory-mapped IO addresses.

Configuration of these chipsets requires among other things that the BIOS write appropriate values into the top of lower memory ("TOLM") register and into the DRAM row boundary 7 ("DRB7") register. The TOLM register is designed to contain the maximum address below 4 GB that should be treated as main memory. The DRB7 register is designed to contain the maximum address in the machine that should be treated as main memory. Thus, for machines having less physical memory than 4 GB minus the minimum size required for the PCI memory address range, the TOLM and DRB7 registers will contain the same value. But for machines having more memory than that, the physical memory must be split because the PCI memory address range may not be moved. In such machines, there will be one region of physical memory located below the PCI range, and another region of physical memory located above the PCI range. The TOLM register will indicate the highest address within the first range. The DRB7 register will indicate the highest address within the second range.

Prior Art Recommendation for Setting TOLM. In reference to setting the value to be contained by the TOLM register, the E7501 chipset data sheet contains the following recommendation: "Configuration software should set this value to either the maximum amount of memory in the system or to the minimum address allocated for PCI memory, whichever is smaller." In other words, the prior art recommendation for setting TOLM is to choose a value that will maximize the amount of physical memory located below the PCI range, regardless of the amount of physical memory available on the machine.

SUMMARY OF THE INVENTION

In one aspect, a method of configuring IA-32 computer resources according to a preferred embodiment of the invention includes determining the amount of physical memory available in the computer and the minimum total size required for memory-mapped IO. If the amount of available physical memory is less than or equal to 4 GB, then the minimum required memory-mapped IO size is rounded up to the next multiple of 128 M. Otherwise, the minimum required memory-mapped IO size is rounded up to the next multiple of x, where x is determined responsive to the number of DIMM socket pairs available in the computer. The top of lower memory is then set equal to 4 GB minus the rounded memory-mapped IO size.

In one embodiment, the function for determining x may be as follows: when the number of DIMM socket pairs available is 2, x equals 256 MB; when the number of DIMM socket pairs available is 3, x equals 512 MB; when the number of DIMM socket pairs available is 4, x equals 1024 MB; when the number of DIMM socket pairs available is greater than 4, x equals 2 GB; otherwise, the value of x is undefined.

Configuring the resources of a computer in accordance with the invention yields the advantage that multiple operating systems and memory sizes are accommodated automatically on IA-32 platforms. For operating systems that can address only up to 4 GB of the address space, the inventive method chooses an acceptable value for TOLM because the granularity used to choose the value is reasonably small—128 MB. For operating systems that can address more than 4 GB of the address space, the method chooses an exceptionally good value for TOLM in the following sense: Regardless of the amount of physical memory available on the machine, the value chosen for TOLM will enable the BIOS to define caching characteristics for all of the memory using a maximum of 6 of the available 8 pairs of MTRR's. Moreover, the BIOS is enabled to do so without the use of overlapping techniques that may impose unwanted caching characteristics on the PCI memory address range. This is important because some operating systems—Linux, for example—require the use of 2 MTRR's to define the caching characteristics of regions within the PCI memory address range that are used for high-performance graphics operations.

DETAILED DESCRIPTION OF THE PREFERRED EMBODIMENTS

Figure 1:
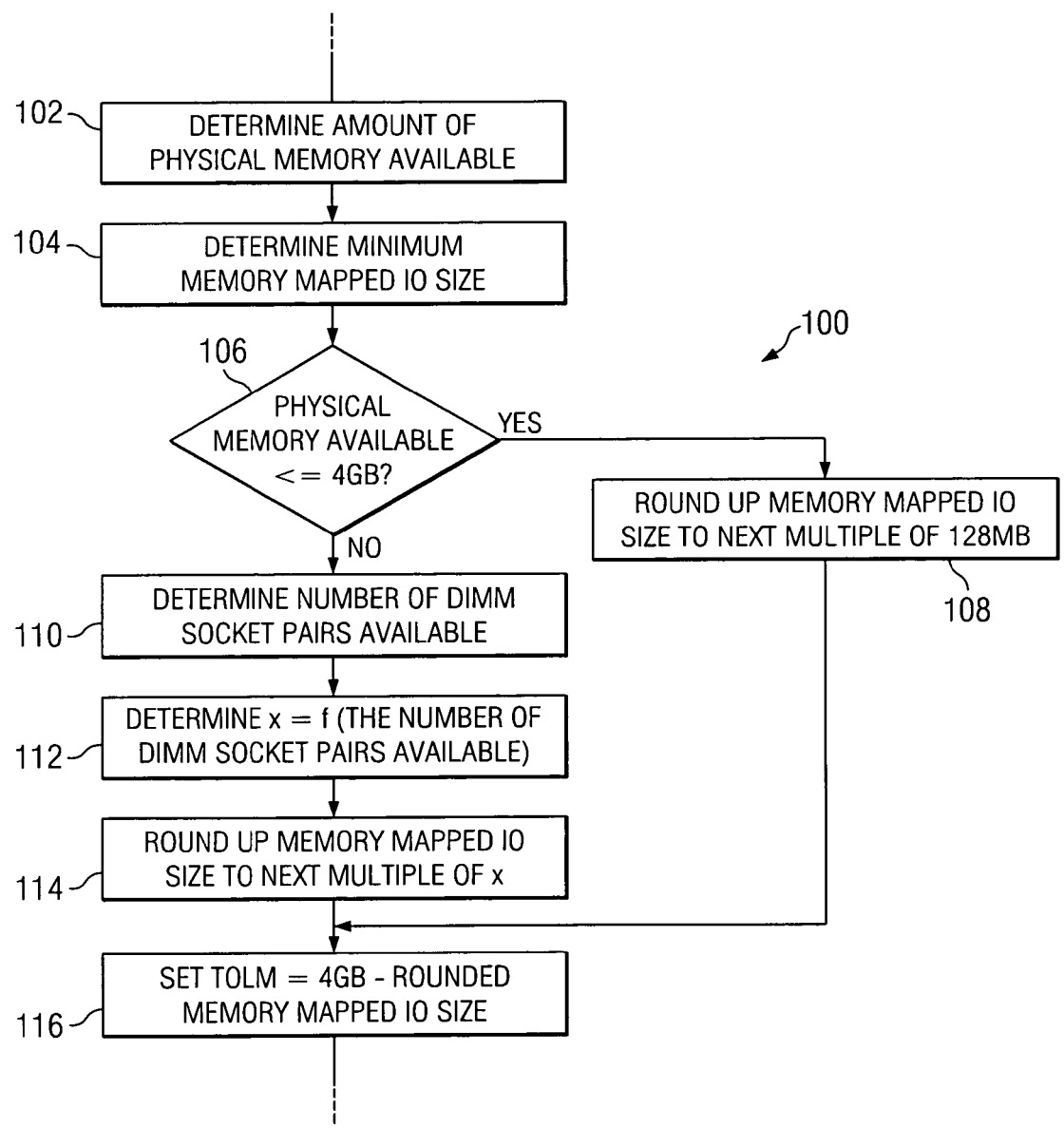
FIG. 1 is a flow diagram illustrating a method of configuring computer resources according to a preferred embodiment of the invention.

FIG. 1 illustrates a method 100 of configuring IA-32 computer resources according to a preferred embodiment of the invention. In one embodiment, the method was implemented in the BIOS. In alternative embodiments, the method may be implemented in other firmware or in software or hardware. In step 102, the method determines the amount of physical memory available in the computer. In step 104, the method determines the minimum size needed to contain the memory-mapped IO area. In step 106, a test determines whether the amount of physical memory available is less than or equal to 4 GB. If so, then the minimum memory-mapped IO size is rounded up to the next multiple of 128 MB in step 108, and execution continues with step 116. But if not, then execution continues with step 110.

In step 110, the method determines the number of DIMM socket pairs available in the computer. In step 112, the method determines a value x as a function of the number of DIMM socket pairs available. In step 114, the minimum memory-mapped IO size is rounded up to the next multiple of x. In step 116, the value of TOLM is set equal to 4 GB minus the rounded up memory-mapped IO size.

Figure 2:
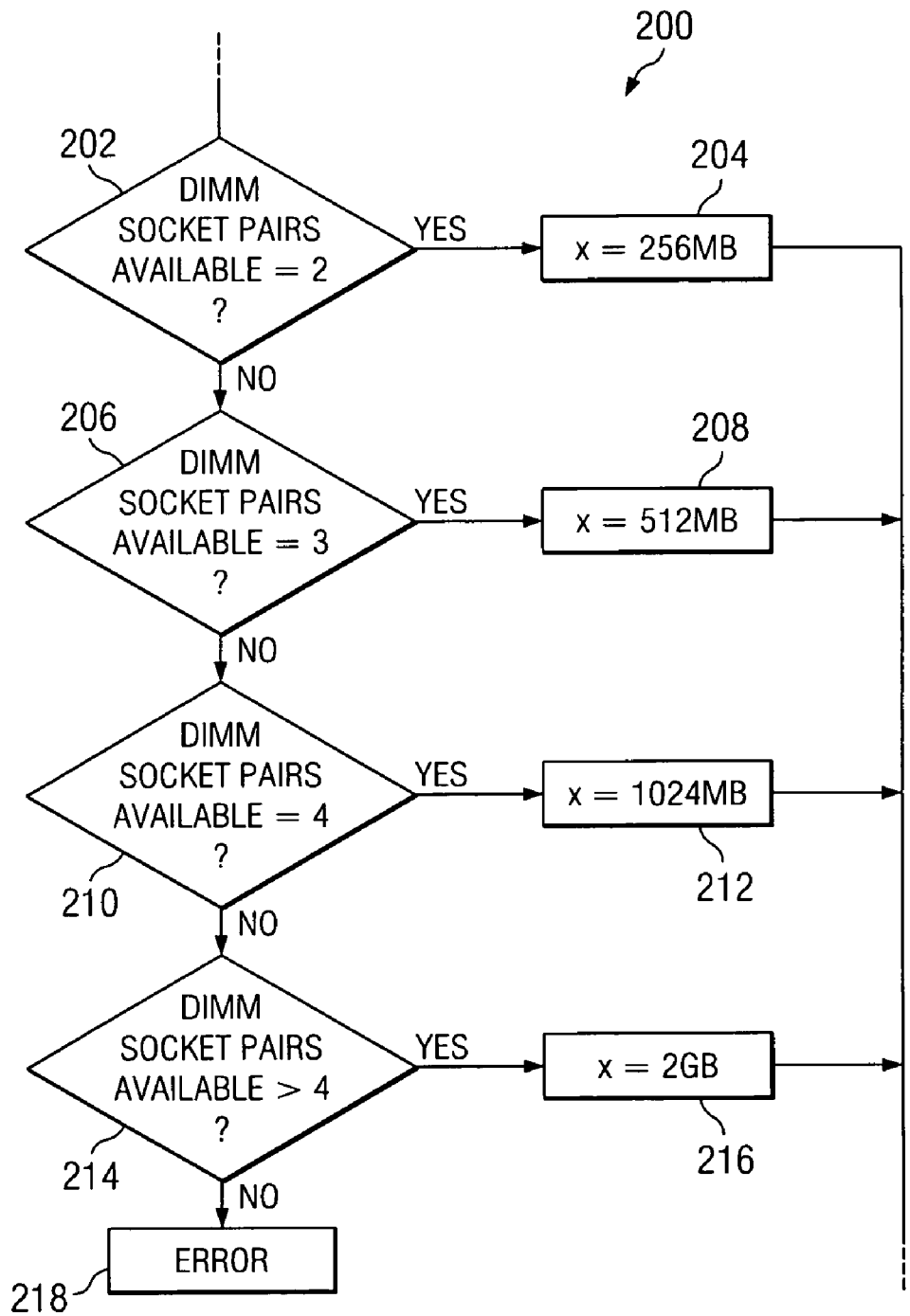
FIG. 2 is a flow diagram illustrating a preferred method of determining x in the diagram of FIG. 1.

FIG. 2 illustrates a preferred method 200 for determining the value of x in step 112. In steps 202 and 204, if the number of DIMM socket pairs available is 2, then x is set to 256 MB and the method returns. Else, in steps 206 and 208, if the number of DIMM socket pairs available is 3, then x is set to 512 MB and the method returns. Else, in steps 210 and 212, if the number of DIMM socket pairs available is 4, then x is set to 1024 MB and the method returns. Else, in steps 214 and 216, if the number of DIMM socket pairs available is greater than 4, then x is set to 2 GB and the method returns. Any other numbers of DIMM socket pairs available (such as 1) would be an error condition, as indicated at step 218.

After determining the value of TOLM in accordance with the invention, MTRR pairs may be programmed to define caching characteristics for physical memory. Preferably, the MTRR's programmed by the BIOS should not dictate caching characteristics for the memory-mapped IO region. This is so because some operating systems, such as Linux, prefer to do so themselves after the BIOS has configured the rest of the system. In addition, care should be taken so that the BIOS uses at most 6 pairs of MTRR's when defining the caching characteristics for physical memory. This is so because some operating systems, such as Linux, that assign caching characteristics to the memory-mapped IO region, require 2 MTRR pairs to do so. In this regard, note that an MTRR pair is only capable of defining a memory region having a size that is equal to an even power of 2.

Consideration of a few examples will illustrate how the method of the invention successfully achieves the above objectives in a variety of worst-case circumstances. In one case, assume that total physical memory is determined to be 4 GB (actually 4096 MB), and that the minimum memory-mapped IO size is less than 128 MB. Memory-mapped IO size is rounded up to 128 MB in step 108. In step 116, TOLM is set to 3968 MB (4096 MB minus 128 MB). This leaves 128 MB of physical memory above the PCI memory address range. A total of 6 MTRR pairs would be required to define caching characteristics for physical memory. Five MTRR pairs would define caching characteristics below the memory-mapped IO region as follows: 3968 MB=2048 MB+1024 MB+512 MB+256 MB+128 MB. One MTRR pair would define characteristics for the 128 MB above the PCI memory address range as follows: 128 MB=128 MB.

In another case, assume that total physical memory is determined to be 6 GB, that the number of DIMM socket pairs available is 2, and that the minimum memory-mapped IO size is less than 256 MB. Memory-mapped IO size is rounded up to 256 MB in step 114. In step 116, TOLM is set to 3840 MB (4096 MB minus 256 MB). This leaves 2560 MB of physical memory above the PCI memory address range. A total of 6 MTRR pairs would be required to define caching characteristics for physical memory. Four MTRR pairs would define caching characteristics below the memory-mapped IO region as follows: 3840MB=2048 MB+1024 MB+512 MB+256 MB. Two MTRR pairs would define characteristics for the 2560 MB above the PCI memory address range as follows: 2560 MB=2048 MB+512 MB.

In another case, assume that total physical memory is determined to be 7 GB, that the number of DIMM socket pairs available is 3, and that the minimum memory-mapped IO size is less than 512 MB. Memory-mapped IO size is rounded up to 512 MB in step 114. In step 116, TOLM is set to 3584 MB (4096 MB minus 512 MB). This leaves 3584 MB of physical memory above the PCI memory address range. A total of 6 MTRR pairs would be required to define caching characteristics for physical memory. Three MTRR pairs would define caching characteristics below the memory-mapped IO region as follows: 3584 MB=2048 MB+1024 MB+512 MB. Three MTRR pairs would define characteristics for the 3584 MB above the PCI memory address range as follows: 3584 MB=2048 MB+1024 MB+512 MB.

In yet another case, assume that total physical memory is determined to be 14 GB, that the number of DIMM socket pairs available is 4, and that the minimum memory-mapped IO size is less than 1024 MB. Memory-mapped IO size is rounded up to 1024 MB in step 114. In step 116, TOLM is set to 3072 MB (4096 MB minus 1024 MB). This leaves 11264 MB of physical memory above the PCI memory address range. A total of 5 MTRR pairs would be required to define caching characteristics for physical memory. Two MTRR pairs would define caching characteristics below the memory-mapped IO region as follows: 3072 MB=2048 MB+1024 MB. Three MTRR pairs would define characteristics for the 11264 MB above the PCI memory address range as follows: 11264 MB=8192 MB+2048 MB+1024 MB.

While the invention has been described in detail in relation to preferred embodiments thereof, the described embodiments have been presented by way of example and not by way of limitation. It will be understood by those skilled in the art that various changes may be made in the form and details of the described embodiments, resulting in equivalent embodiments that remain within the scope of the appended claims.

I claim:

1. A method of configuring IA-32 computer resources, comprising:
   determining an amount of physical memory available and a minimum memory-mapped IO size;
   if the amount of physical memory available is less than or equal to 4 GB:
      determining a rounded memory-mapped IO size by rounding up the minimum memory-mapped IO size to the next multiple of 128 M;
   else:
      determining a number of DIMM socket pairs available; and
      determining the rounded memory-mapped IO size by rounding up the minimum memory-mapped IO size to the next multiple of x, where x is a function of the number of DIMM socket pairs available; and
   setting the top of lower memory equal to 4 GB minus the rounded memory-mapped IO size.

2. The method of claim 1, wherein:
   x equals 256 M if the number of DIMM socket pairs available equals 2.

3. The method of claim 1, wherein:
   x equals 512 M if the number of DIMM socket pairs available equals 3.

4. The method of claim 1, wherein:
   x equals 1024 M if the number of DIMM socket pairs available equals 4.

5. The method of claim 1, wherein:
   x equals 2 G if the number of DIMM socket pairs available exceeds 4.

6. The method of claim 1, further comprising:
   programming one or more pairs of MTRR's to define caching characteristics of the physical memory without including the PCI memory address range in any region defined by the one or more pairs of MTRR's.

7. The method of claim 1, further comprising:
   using a maximum of 6 pairs of MTRR's to define caching characteristics of the physical memory.

8. The method of claim 6, further comprising:
   using a maximum of 6 pairs of MTRR's to define the caching characteristics of the physical memory.

9. A machine-readable storage containing code that, when executed on a computer, causes the computer to perform a method of configuring IA-32 computer resources, the method comprising:
   determining an amount of physical memory available and a minimum memory-mapped IO size;
   if the amount of physical memory available is less than or equal to 4 GB:
      determining a rounded memory-mapped IO size by rounding up the minimum memory-mapped IO size to the next multiple of 128 M;
   else:
      determining a number of DIMM socket pairs available; and
      determining the rounded memory-mapped IO size by rounding up the minimum memory-mapped IO size to the next multiple of x, where x is a function of the number of DIMM socket pairs available; and
   setting the top of lower memory equal to 4 GB minus the rounded memory-mapped IO size.

10. The storage of claim 9, wherein:
    x equals 256 M if the number of DIMM socket pairs available equals 2.

11. The storage of claim 9, wherein:
    x equals 512 M if the number of DIMM socket pairs available equals 3.

12. The storage of claim 9, wherein:
    x equals 1024M if the number of DIMM socket pairs available equals 4.

13. The storage of claim 9, wherein:
    x equals 2 G if the number of DIMM socket pairs available exceeds 4.

14. The storage of claim 9, wherein the method further comprises:
    programming one or more pairs of MTRR's to define caching characteristics of the physical memory without including the PCI memory address range in any region defined by the one or more pairs of MTRR's.

15. The storage of claim 9, wherein the method further comprises:
    using a maximum of 6 pairs of MTRR's to define caching characteristics of the physical memory.

16. The storage of claim 14, wherein the method further comprises:
    using a maximum of 6 pairs of MTRR's to define the caching characteristics of the physical memory.

* * * * *